Oct. 30, 1928.

H. G. REIST 1,689,499

DYNAMO ELECTRIC MACHINE ROTOR

Filed Feb. 17, 1927

Inventor:
Henry G. Reist,
by his Attorney.

Patented Oct. 30, 1928.

1,689,499

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC-MACHINE ROTOR.

Application filed February 17, 1927. Serial No. 169,046.

My invention relates to dynamo-electric machines and more particularly to the construction of rotors therefor.

It is the object of my invention to minimize the amount of material necessary to build these rotors, and at the same time facilitate the circulation of cooling air therethrough during their operation.

Figure 1:
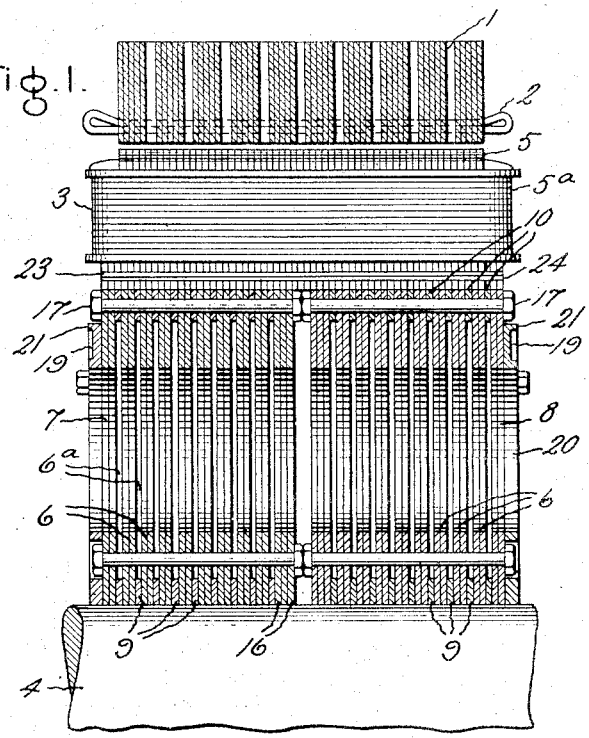
Figure 2:
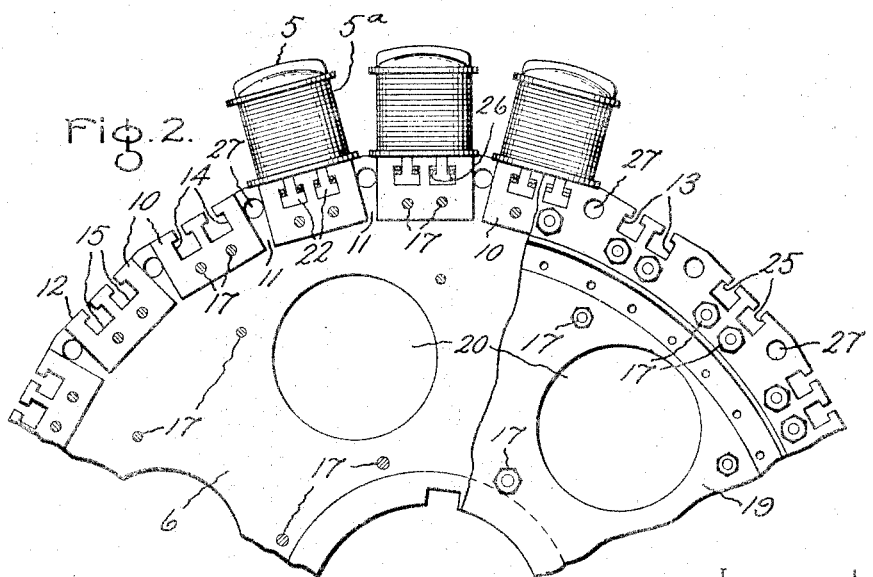

The invention will be more fully understood by reference to the following description taken in connection with the accompanying drawing, in which Fig. 1 is a fragmentary sectional view of a dynamo-electric machine embodying my improved rotor; and Fig. 2 is a side elevation of the rotor with parts removed and partly broken away to show more clearly its construction.

Referring to the drawing, a stator 1 of a dynamo-electric machine is provided with windings 2 disposed in slots. A rotor 3 is carried by a suitable shaft 4 which is mounted in bearings and arranged so that the pole pieces 5 will be rotated closely adjacent the stator 1. For convenience in constructing the rotor it is preferred to arrange the laminations to form a plurality of sections, as 7 and 8 shown in the drawing. Although I have illustrated two sections I may employ several or if desired the rotor may be made of a single section. In this instance I have shown these sections mounted directly on the shaft 4 but it is obvious that a hub may be used engaging the shaft on which the sections may be mounted. Each of the sections are made up of laminations 6 that are spaced longitudinally on the shaft 4 by the rings 9 and are spaced adjacent their periphery by a series of circumferentially spaced plates 10 interposed therebetween, as shown in Fig. 2. By spacing certain of the laminations by the rings adjacent the shaft and the plates adjacent the periphery of the laminations a substantial economy of the material required to construct the rotor is effected, and such an arrangement has the added advantage of permitting a circulation of air through openings $6^a$ and outwardly between the plates at 11. Pairs of laminations 6 are spaced in this manner, but any other convenient grouping may be resorted to which will give the rotor the necessary strength and rigidity. The peripheries of the laminations 6 are formed with a series of sides 12 that are slotted at 13. The plates 10 are also provided with slots 14 aligned with the slots 13 to form grooves 15 extending axially of the rotor, and the plates 10 have edges aligned with the sides forming the peripheries of said laminations in order to form a continuous surface extending axially of the rotor. Adjacent the inside of each section a group of three laminations, as shown at 16, is used to increase the rigidity of the structure and bolts 17 clamp each section together. An annular plate 19 is secured to the end of each section and is provided with a plurality of openings 20 therein. The grooves 15 of the sections are aligned to form a continuous groove extending axially of the rotor adapted to receive shouldered extensions 22 of pole pieces 5 which extend longitudinally of both sections, said pole pieces engaging the bearing surfaces formed by the sides around the periphery of the laminations and the spacing plates therebetween. In order to secure the pole pieces 5 to the rotor tapered keys 23 and 24 are driven in grooves 15 bearing against shoulders 25 of said grooves and shoulders 26 of the pole projections thereby firmly clamping said pole pieces on said sections and forming a unitary structure. The pole pieces 5 are provided with coils $5^a$ which may be retained in place by means of coil brackets secured in openings 27 between plates 10 and adjacent the periphery of the laminations.

It will be seen from the foregoing description that I have produced a rotor construction requiring substantially less material than rotors as heretofore constructed, and at the same time obtained the necessary rigidity of construction required for mounting the pole pieces securely on the rotor, and that my arrangement of parts has the added advantage of facilitating the circulation of air for cooling purposes.

I desire it to be understood that my invention is not to be limited to the particular rotor construction shown and described as it is obvious that the grouping of the spaced laminations may be varied or the circumferentially spaced plates may be extended to engage a plurality of pole projections, and I intend in the appended claims to cover all modifications which do not depart from the spirit and scope of my invention.

What I claim as new and desire to secure by Letters Patent of the United States, is:

1. In a dynamo-electric machine, a rotor including a shaft, laminations carried by said shaft, means adjacent thereto for spacing laminations longitudinally thereof, said laminations being slotted adjacent their periphery, means interposed between said laminations adjacent their periphery having slots conforming with the slots in said laminations to form continuous grooves axially of said rotor, means for clamping said laminations together, and pole pieces extending into said grooves.

2. In a dynamo-electric machine, a rotor including a shaft, laminations carried by said shaft, means adjacent the shaft for spacing laminations longitudinally thereof, said laminations having a series of sides forming their peripheries aligned to form a series of surfaces extending axially of said rotor, plates circumferentially arranged having their edges aligned with the sides of said laminations and disposed therebetween to form a continuous bearing surface, said plates and said laminations being slotted longitudinally of the rotor, and pole pieces extending into said slots and engaging said bearing surfaces.

3. In a dynamo-electric machine, a rotor including a shaft, laminations carried by the shaft, circumferentially extending plates interposed between said laminations for spacing them axially of the shaft, means for clamping said laminations and said plates together, pole pieces engaging said laminations, and means for securing said pole pieces to said laminations.

4. In a dynamo-electric machine, a rotor including a shaft, laminations carried by the shaft, circumferentially extending plates interposed between said laminations for spacing them axially of the shaft, said plates having their edges in alignment with the edges of said laminations to form a bearing surface extending longitudinally of said rotor, means for clamping said laminations and said plates together, a pole piece engaging said bearing surface, and means for securing said pole pieces to said rotor.

5. In a dynamo-electric machine, a rotor including a shaft, laminations carried by the shaft having openings aligned to form air passages, circumferentially spaced plates for spacing said laminations longitudinally of the shaft, said laminations and said plates having longitudinally aligned slots, means for clamping said laminations and said plates together, and pole pieces extending into said slots.

6. In a dynamo-electric machine, a rotor including a shaft, laminations carried by the shaft having openings aligned to form air passages, said laminations being formed with a series of sides, circumferentially spaced plates between said laminations for spacing them longitudinally of said shaft having their edges aligned with the sides of said laminations, said laminations and said plates having slots aligned to form grooves extending longitudinally of the rotor, means for clamping said laminations and said plates together, and pole pieces extending into said grooves.

7. In a dynamo-electric machine, a rotor including a shaft, a plurality of sections carried by said shaft each including laminations spaced longitudinally thereof, rings surrounding the shaft and interposed between said laminations, a series of circumferentially spaced plates adjacent the periphery of said laminations and disposed therebetween, said plates and said laminations having aligned slots forming grooves longitudianlly of the rotor, means for clamping said laminations, said rings, and said plates together, and pole pieces engaging grooves in each section.

8. In a dynamo-electric machine, a rotor including a shaft, a plurality of sections carried by said shaft each including laminations spaced longitudinally thereof and having openings in alignment forming air passages, rings surrounding the shaft and interposed between laminations, a series of circumferentially spaced plates adjacent the periphery of said laminations and disposed therebetween, said plates and said laminations having aligned slots forming grooves longitudinally of the rotor, means for clamping said laminations, said rings, and said plates together, and pole pieces engaging grooves in each section.

In witness whereof, I have hereunto set my hand this 16th day of February, 1927.

HENRY G. REIST